(12) United States Patent
Liao

(10) Patent No.: US 8,918,090 B2
(45) Date of Patent: Dec. 23, 2014

(54) TIMER CONFIGURATION METHOD AND RELATED COMMUNICATION DEVICE

(75) Inventor: Ching-Yu Liao, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 5 days.

(21) Appl. No.: 13/288,973

(22) Filed: Nov. 4, 2011

(65) Prior Publication Data

US 2012/0115454 A1    May 10, 2012

Related U.S. Application Data

(60) Provisional application No. 61/409,986, filed on Nov. 4, 2010, provisional application No. 61/452,174, filed on Mar. 14, 2011, provisional application No. 61/475,681, filed on Apr. 15, 2011.

(51) Int. Cl.
*H04M 3/00* (2006.01)
*H04W 4/00* (2009.01)
*H04W 60/02* (2009.01)

(52) U.S. Cl.
CPC .................................... *H04W 60/02* (2013.01)
USPC ........................................ 455/418; 455/435.1

(58) Field of Classification Search
USPC ................ 455/404.2, 418–422.1, 432.1–443, 455/456.1, 550.1, 552.1, 553.1; 370/310.2, 370/230, 328, 338
See application file for complete search history.

(56) References Cited

U.S. PATENT DOCUMENTS

| 2002/0163906 | A1 | 11/2002 | Diachina |
| 2004/0192252 | A1 | 9/2004 | Aerrabotu |
| 2005/0119008 | A1* | 6/2005 | Haumont ................. 455/456.1 |
| 2006/0187933 | A1* | 8/2006 | Yi ............................. 370/395.2 |
| 2009/0305707 | A1 | 12/2009 | Pudney |
| 2010/0061331 | A1 | 3/2010 | Guo |
| 2010/0159991 | A1 | 6/2010 | Fu |
| 2010/0240367 | A1* | 9/2010 | Lee et al. ................. 455/435.2 |
| 2011/0171926 | A1 | 7/2011 | Faccin |
| 2011/0201343 | A1 | 8/2011 | Pinheiro |
| 2012/0106332 | A1* | 5/2012 | Tiwari ......................... 370/230 |
| 2012/0202500 | A1 | 8/2012 | Wu |

FOREIGN PATENT DOCUMENTS

| CN | 101730179 A | 6/2010 |
| CN | 101841793 A | 9/2010 |
| EP | 1 468 582 | 10/2004 |
| JP | 2005531223 A | 10/2005 |
| TW | 201108827 | 3/2011 |
| WO | 03001830 A1 | 1/2003 |
| WO | 03/063535 A1 | 7/2003 |
| WO | 04002051 | 12/2003 |
| WO | 2011135790 A1 | 11/2011 |

OTHER PUBLICATIONS

European patent application No. 11008794.7, European Search Report mailing date: Feb. 29, 2012.

(Continued)

*Primary Examiner* — San Htun

(74) *Attorney, Agent, or Firm* — Winston Hsu; Scott Margo

(57) ABSTRACT

A timer configuration method for a core network in a wireless communication system is disclosed. The timer configuration method comprises receiving a mobility management request from a mobile device; and setting a mobile reachable timer to a value no less than a back-off timer value when the core network rejects the mobility management request with the back-off timer value.

3 Claims, 14 Drawing Sheets

(56) References Cited

OTHER PUBLICATIONS

ETSI TS 124 008 V9.4.0 (Oct. 2010), "Digital cellular telecommunications system (Phase 2+); Universal Mobile Telecommunications System (UMTS); LTE; Mobile radio interface Layer 3 specification; Core network protocols; Stage 3 (3GPP TS 24.008 version 9.4.0 Release 9)", XP014061450, p. 118 line 22-25 and line 41-42, p. 119 line 10-13 and line 25-28, par. 9.4.14, par. 9.4.17, par. 9.4.17.1, table 9.4.17 and table 11.3a.

Ericsson, ST-Ericsson, "Evaluation and conclusion of overload congestion control", 3GPP TSG SA WG2 Meeting #79electronic, TD S2-103135, Elbonia, Jul. 6-10, 2010, XP050458220, p. 1-3.

Liao, Title of Invention: Timer Configuration Method, U.S. Appl. No. 13/372,514, filed Feb. 14, 2012.

European patent application No. 12000954.3, European application filing date: Feb. 14, 2012, European Search Report mailing date: Jul. 31, 2012.

ZTE, "Emergency attach during back off duration", 3GPP TSG-CT WG1 Meeting #69, C1-110415, Jan. 24-28, 2011, Ljubljana(Slovenia), XP050479808, pp. 1-3.

HTC Corp., "Handling of periodic TAU timer, mobile reachable timer and MM back-off timer", 3GPP TSG CT WG1 Meeting #69, C1-110181, Jan. 24-28, 2011, Ljubljana(Slovenia), XP050479627, pp. 1-4.

ETSI TS 124 301 V8.8.0 (Jan. 2011), "Universal Mobile Telecommunications System (UMTS); LTE; Non-Access-Stratum (NAS) protocol for Evolved Packet System (EPS); Stage 3 (3GPP TS 24.301 version 8.8.0 Release 8)", XP014061911, coverpage, pp. 1-262.

European patent application No. 12001754.6, European Search Report mailing date: Apr. 18, 2012.

CATT, "UE supports the NAS back-off timer", 3GPP TSG SA WG2 Meeting #81, S2-104878, Oct. 11-15, 2010, Prague, Czech Republic, XP050459666, pp. 1-2.

Notice of Allowance mailed on Dec. 11, 2012 for the U.S. Appl. No. 13/372,514, filed Feb. 14, 2012, p. 1-34.

Office Action mailed on Jun. 18, 2013 for the Japanese Application No. 2012-029945, filing date Feb. 14, 2012, pp. 1-5.

3GPP TS 24.008 V10.0.0 (Sep. 2010).

3GPP TR 23.888 V1.0.0 (Jul. 2010).

Notice of allowance mailed on Apr. 25, 2013 for the Korean application No. 10-2011-0114751, filing date Nov. 4, 2011, pp. 1-2.

3GPP TS 23.401 V10.1.0 (Sep. 2010) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10).

3GPP TS 24.301 V10.0.0 (Sep. 2010) Technical Specification 3rd Generation Partnership Project; Technical Specification Group Core Network and Terminals; Non-Access-Stratum (NAS) protocol for Evolved Packet System (EPS); Stage 3 (Release 10).

3GPP TS 24.008 V10.0.0 3rd Generation Partnership Project; Technical Specification Group Core Network and Terminals; Mobile radio interface Layer 3 specification; Core network protocols; Stage 3 (Release 10), Sep. 2010.

3GPP TSG-CT WG1 Meeting #67, C1-104431, Barcelona, Spain, Oct. 11-15, 2010.

3GPP TSG-SA WG2 Meeting #83, S2-111253, Salt Lake City, USA, Feb. 21-25, 2011.

3GPP TSG SA WG2 Meeting #83, S2-111204, Feb. 21-25, 2011, Salt Lake City, Utah, USA.

3GPP TSG-CT WG1 Meeting #70, C1-111522, Salt Lake City, Utah (USA), Feb. 21-25, 2011.

3GPP TSG-CT WG1 Meeting #70, C1-111164, Salt Lake City, Utah (USA), Feb. 21-25, 2011.

3GPP TSG-CT WG1 Meeting #70, C1-110789, Salt Lake City, Utah (USA), Feb. 21-25, 2011.

3GPP TSG-CT WG1 Meeting #70, C1-110788, Salt Lake City, Utah (USA), Feb. 21-25, 2011.

3GPP TSG-CT WG1 Meeting #69, C1-110745, Ljubljana (Slovenia), Jan. 24-28, 2011.

3GPP TSG-CT WG1 Meeting #69, C1-110744, Ljubljana (Slovenia), Jan. 24-28, 2011.

Notice of allowance mailed on Jul. 30, 2013 for the Japanese application No. 2011-242743, filing date Nov. 4, 2011, pp. 1-3.

3rd Generation Partnership Project; I Specification Group Core Network Terminals, Non-Access-Stratum (NAS) protocol for Evolved Packet System (EPS); Stage 3 (Release 11), 3GPP TS 24.301 V11.0.0 (Sep. 2011) Technical Specification, cover page, pp. 53-55.

Office action mailed on May 6, 2014 for the China application No. 201110346189.6, filing date: Nov. 4, 2011.

Office action mailed on May 28, 2014 for the Taiwan application No. 100140453, filing date: Nov. 4, 2011, p. 1-7.

Notice of Allowance mailed on Dec. 23, 2013 for the U.S. Appl. No. 13/419,445, filed Mar. 14, 2012, p. 1-38.

Office action mailed on Mar. 5, 2014 for the China application No. 201210040264.0, filing date Feb. 14, 2012.

Office action mailed on Jun. 3, 2014 for the China application No. 201210067307.4, filing date: Mar. 14, 2012.

3GPP TS 23.060 V10.2.0 (Dec. 2010) 3rd Generation Partnership Project; Technical Specification Group Services and System Aspects; General Packet Radio Service (GPRS); Service description; Stage 2 (Release 10), cover page, p. 27, 28, 52, 53, and 71-76.

Ericsson, ST-Ericsson, "Conclusion on periodic update timers", 3GPP TSG SA WG2 Meeting #79electronic, TD S2-103134, Jul. 6-10, 2010, Elbonia, p. 1-4.

Ericsson, ST-Ericsson, Evaluation and conclusion of overload congestion control, 3GPP TSG SA WG2 Meeting #79electronic, TD S2-103135, Jul. 6-10, 2010, Elbonia A, p. 1-3.

Office action mailed on May 16, 2014 for the Taiwan application No. 101108696, filing date Mar. 14, 2012, p. 1-3.

* cited by examiner

TIMER CONFIGURATION METHOD AND RELATED COMMUNICATION DEVICE

CROSS REFERENCE TO RELATED APPLICATIONS

This application claims the benefit of U.S. Provisional Application No. 61/409,986, filed on Nov. 4, 2010 and entitled "Method to handle periodic timer, mobile reachability timer, and MM backoff timer", and the benefit of U.S. Provisional Application No. 61/452,174, filed on Mar. 14, 2011 and entitled "Method to handle periodic timer, mobile reachability timer, and MM backoff timer" and the benefit of U.S. Provisional Application No. 61/475,681, filed on Apr. 15, 2011 and entitled "Method to handle periodic timer, mobile reachability timer, and MM backoff timer", the contents of which are incorporated herein in their entirety.

BACKGROUND OF THE INVENTION

1. Field of the Invention

The application relates to a method and a related communication device used in a wireless communication system and related communication device, and more particularly, to a timer configuration method and a related communication device in a wireless communication system.

2. Description of the Prior Art

A long-term evolution (LTE) system supporting the 3GPP Rel-8 standard and/or the 3GPP Rel-9 standard is developed by the 3rd Generation Partnership Project (3GPP) as a successor of a universal mobile telecommunications system (UMTS), for further enhancing performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple user equipments (UEs), and communicates with a core network including a mobility management entity (MME), serving gateway, etc for Non Access Stratum (NAS) control. In UMTS system, a Serving GPRS Support Node (SGSN) is responsible for the delivery of data packets to the mobile devices back and forth within its geographical service area, including packet routing and transfer, mobility management (attach/detach and location management), logical link management, and authentication and charging functions. The MME also provides the control plane function for mobility between LTE and 2G/3G access networks with the S3 interface terminating at the MME from the SGSN.

An access point name (APN) is used in the LTE system and the LTE-A system for establishing packet data connections, and is managed by the MME. Further, the APN is used for identifying a packet data network (PDN) or a service type (e.g. multimedia messaging service (MMS)), wherein the PDN or the service type is carried on the packet data connections.

The core network manages the mobile reachability by using mobile reachable timer, paging proceed factor (PPF), and implicit detach timer. The core network supervises the periodic tracking/routing/location area update procedure of the UE by means of the mobile reachable timer. By default, the mobile reachable timer is set slightly larger than the periodic TAU/RAU/LAU timer. Upon expiry of the mobile reachable timer, the network shall clear the PPF flag and start the implicit detach timer. The value of the implicit detach timer is network dependent. Due to the clear of the PPF, the core network cannot page the UE during the period of the implicit detach timer. If the implicit detach timer expires before the UE contacts the network, the network shall implicitly detach the UE. The implicit detach timer shall be stopped when a NAS signaling connection is established for the UE.

NAS level congestion control contains the functions: "APN based congestion control" and "General NAS level Mobility Management control". The use of the APN based congestion control is for avoiding and handling of EMM and ESM signalling congestion associated with UEs with a particular APN. With General NAS level Mobility Management control, the MME may also use the reject of NAS level Mobility Management signaling requests under general congestion conditions.

When the NAS level mobility management congestion control is applied due to network overload or congestion, the MME rejects an attach request, a tracking area update (TAU), a routing area update (RAU) or a service request, and the MME replies the UE with a Mobility Management back-off timer.

When congestion control is active, the MME/SGSN stores the Mobility Management back-off timer and the Session Management back-off timer. Then the MME/SGSN enforces the stored back-off time by immediately rejecting any subsequent request from the UE targeting at connecting to the APN before the stored back-off time is expired.

Since the periodic TAU/RAU timer is not updated by TAU/RAU Reject message, the periodic TAU/RAU timer may trigger the TAU/RAU even when the back-off timer is running, i.e. periodic RAU/TAU timer is shorter than the back-off timer. Therefore, the overload control mechanism does not take effect to reduce signaling load.

Furthermore, if the mobile reachable timer in the MME/SGSN does not refer to the periodic TAU/RAU timer in the UE, the accuracy of the reachabilities of the UEs in MME/SGSN would cause synchronization problem, e.g. misjudging the out-of-coverage of the UE.

SUMMARY OF THE INVENTION

A timer configuration method for a core network in a wireless communication system is provided.

A timer configuration method for a core network in a wireless communication system is disclosed. The timer configuration method comprises receiving a mobility management request from a mobile device; and setting a mobile reachable timer to a value no less than a back-off timer value when the core network rejects the mobility management request with the back-off timer value.

A timer configuration method for a core network in a wireless communication system is disclosed. The timer configuration method comprises receiving a mobility management request from a mobile device; and setting a mobile reachable timer to a mobile reachable timer value and setting an implicit detach timer to an implicit detach timer value when the core network rejects the mobility management request with a back-off timer value, wherein a sum of the mobile reachable timer value and the implicit detach timer value is no less than the back-off timer value.

A timer configuration method for a core network in a wireless communication system is disclosed. The timer configuration method comprises receiving a mobility management request from a mobile device; and setting an implicit detach timer to an implicit detach timer value when the core network rejects the mobility management request with a value of a back-off timer, wherein the implicit detach timer value is no less than a difference value of a value of a mobile reachable timer and the value of the back-off timer.

A timer configuration method for a core network in a wireless communication system is disclosed. The timer configuration method comprises receiving a mobility management request from a mobile device; setting an implicit detach timer to an implicit detach timer value when the core network rejects the mobility management request with a back-off timer value, wherein the implicit detach timer value is no less than the back-off timer value; and starting the implicit detach timer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
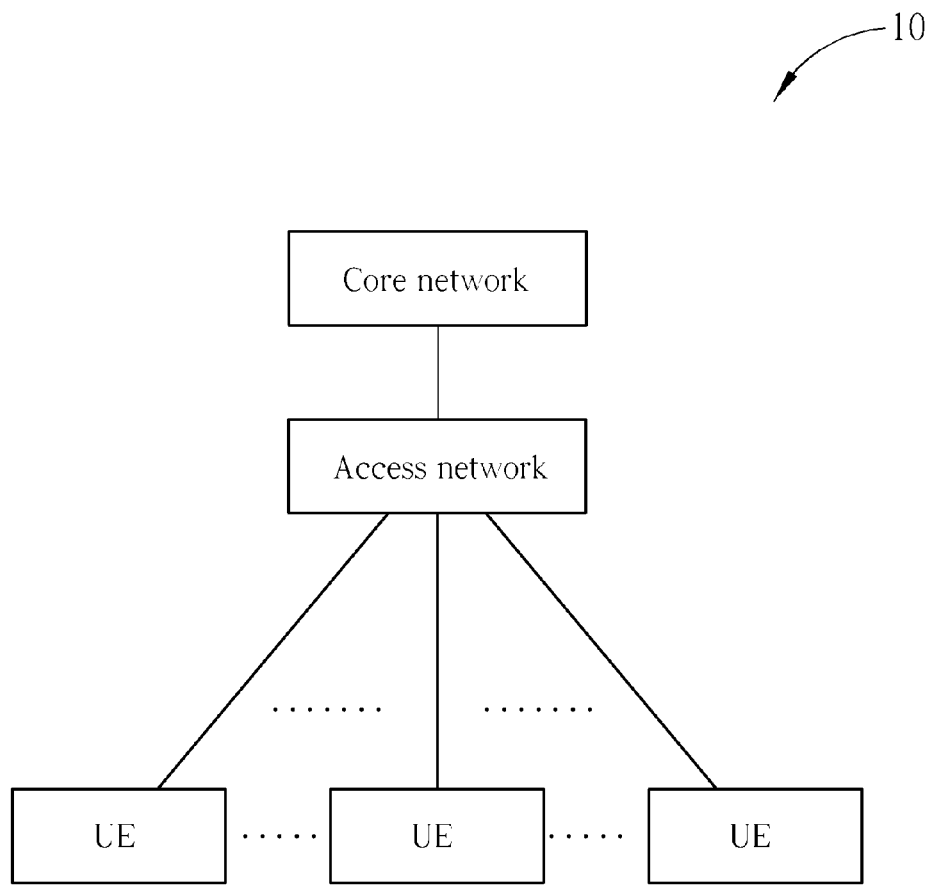
FIG. 1 is a schematic diagram of an exemplary wireless communication system.

Please refer to FIG. 1, which illustrates a schematic diagram of an exemplary wireless communication system 10. Briefly, the wireless communication system 10 is composed of a core network, an access network and a plurality of mobile devices. The wireless communication system 10 can be a GPRS (General Packet Radio Service) system, or any other similar network system such as a GSM (Global System for Mobile communications) system, a UMTS (Universal Mobile Telecommunications System) system, an LTE (long-term evolution) or LTE-Advance system. In FIG. 1, the access network and the UEs are simply utilized for illustrating the structure of the wireless communication system 10. Practically, the access network of the LTE system comprises a plurality of base stations such as an E-UTRAN (evolved-UTAN), which comprises a plurality of evolved Node-Bs (eNBs). In LTE, the core network includes a mobility management entity (MME). The MME is responsible for the delivery of data packets to the mobile devices back and forth within its geographical service area, including packet routing and transfer, mobility management (attach/detach and tracking area management), session management (PDN connection establishment/disconnect), logical link management, and authentication and charging functions. The MME can also serve as a local mobility anchor for inter-working with other RATs (e.g. GSM and UMTS). The access network of the UMTS system comprises a plurality of base stations such as an UTRAN, which comprises a plurality of Node-Bs (NBs). In UMTS, the core network includes a Serving GPRS Support Node (SGSN) is responsible for the delivery of data packets to the mobile devices back and forth within its geographical service area, including packet routing and transfer, mobility management (attach/detach and tracking area management), session management (PDP Context establishment/disconnect), logical link management, and authentication and charging functions. The access network of the GSM system comprises a plurality of base stations such as a GERAN, which comprises a plurality of Base stations (BSSs). In GSM, he core network includes a Mobile Switching Center (MSC) which is responsible for the delivery of voice service in circuit switch manner to the mobile devices back and forth within its geographical service area, including mobility management (attach/detach and location area management), logical link management, and authentication and charging functions. The UEs can be devices such as mobile phones, computer systems, etc. Besides, the access network and the UE can be seen as a transmitter or receiver according to transmission direction, e.g., for uplink, the UE is the transmitter and the network is the receiver, and for downlink, the network is the transmitter and the UE is the receiver.

Figure 2:
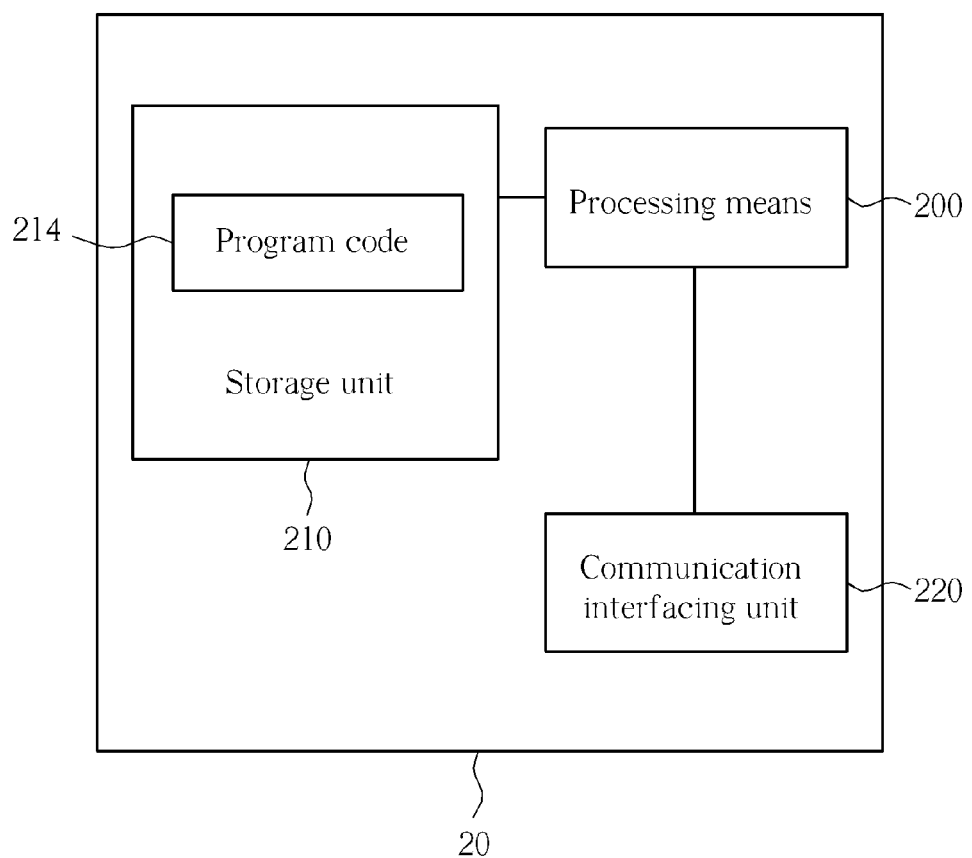
FIG. 2 is a schematic diagram of an exemplary communication device.

Please refer to FIG. 2, which is a schematic diagram of an exemplary communication device 20. The communication device 20 can be the UE or the core network shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, hard disk, and optical data storage device. The communication interfacing unit 220 is preferably a transceiver and can handle timer configuration according to processing results of the processor 200.

Periodic tracking/routing area updating is used to periodically notify the availability of the UE to the network. The procedure is controlled in the UE by the periodic tracking/routing area update timer (timer T3412/T3312). The value of timer T3412/T3312 is sent by the network to the UE in the ATTACH ACCEPT message and can be sent in the TRACKING/ROUTING AREA UPDATE ACCEPT message. The UE shall apply this value in all tracking/routing areas of the list of tracking/routing areas assigned to the UE, until a new value is received. The two separate timers (timer T3412/T3312) run in the UE for notifying availabilities to MME/SGSN/MSC and updating tracking/routing information from MME/SGSN independently. When NAS level mobility management congestion control is activated by the core network, the core network (e.g. MME/SGSN) rejects an attach request, a tracking area update (TAU), a routing area update (RAU) or a service request and the MME replies the UE with a Mobility Management (MM) back-off timer.

Figure 3A:
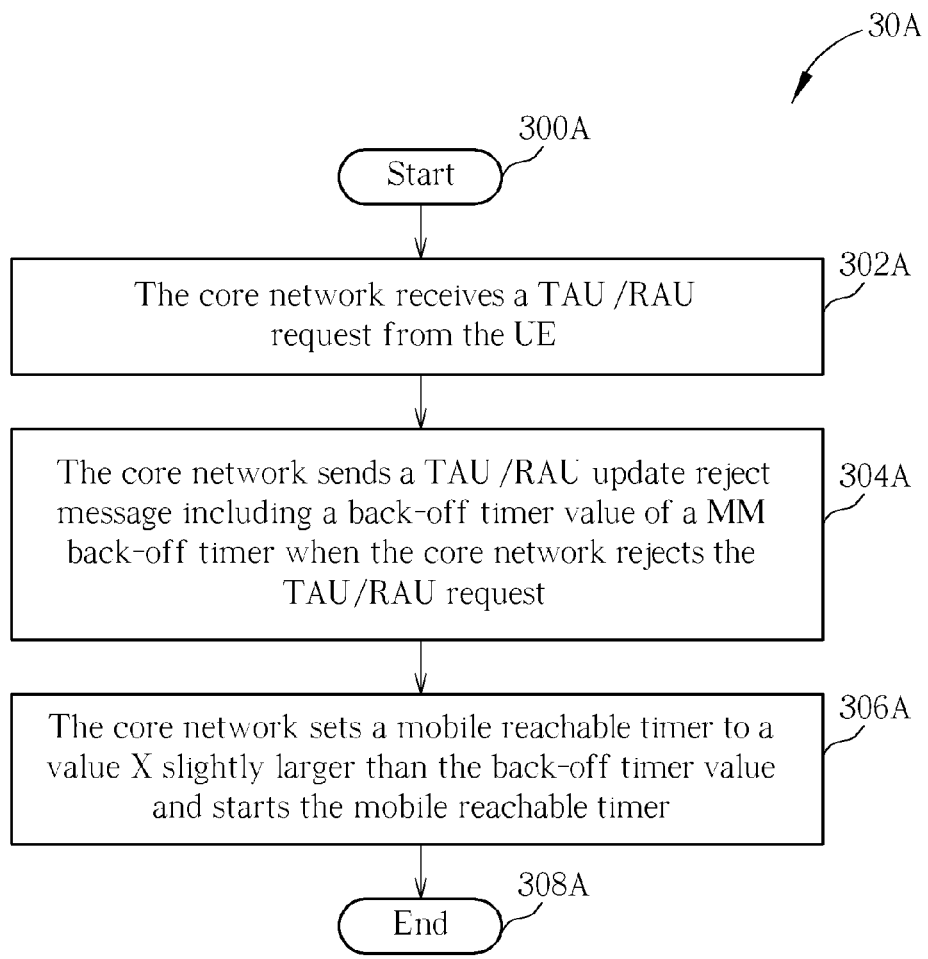
FIGS. 3A and 3B are flowcharts of exemplary processes.
Figure 3B:
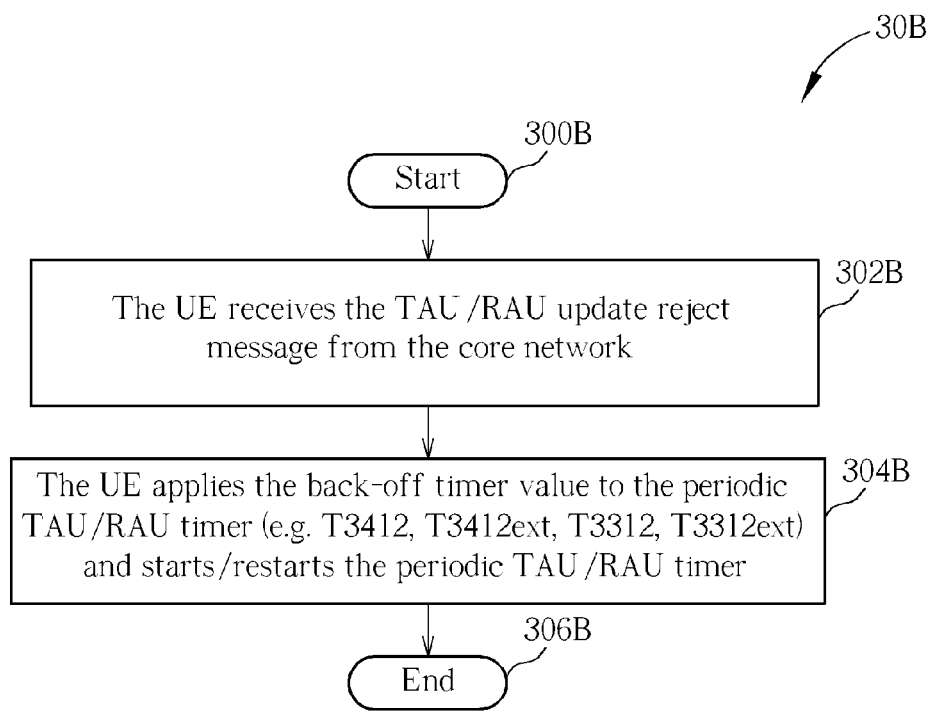

Please refer to FIG. 3A and FIG. 3B, which are flowcharts of exemplary processes 30A and 30B. The process 30A is used for handling timer configuration in the core network (e.g. MME/SGSN) in the wireless communication system 10 and the process 30B is used for handling timer configuration in the UE in the wireless communication system 10. The processes 30A and 30B may be compiled into the program code 214 and includes the following steps:

Step 300A: Start.

Step 302A: The core network receives a TAU/RAU request from the UE.

Step 304A: The core network sends a TAU/RAU reject message including a back-off timer value of a Mobility Management (MM) back-off timer when the core network rejects the TAU/RAU request.

Step 306A: The core network sets a mobile reachable timer to a value X slightly larger than the back-off timer value and starts the mobile reachable timer when the UE enters idle mode.

Step 308A: End.

Step 300B: Start.

Step 302B: The UE receives the TAU/RAU reject message from the core network.

Step 304B: The UE applies the back-off timer value to the periodic TAU/RAU timer (e.g. T3412, T3412ext, T3312, T3312ext) and starts/restarts the periodic TAU/RAU timer. That is, the UE sends periodic TAU/RAU request to the MME/SGSN immediately when the MM back-off timer is expired. The periodic TAU/RAU timer will be reset to its initial value for the next start/restart.

Step 306B: End.

According to the processes 30A and 30B, the core network (e.g. MME/SGSN) receives the TAU/RAU request from the UE. The core network sends a TAU/RAU reject message including the back-off timer value of the MM back-off timer to the UE. The rejection of the TAU/RAU could be caused by NAS level Mobility Management Congestion Control. Then the core network sets the mobile reachable timer to the value X and starts the mobile reachable timer when the UE enters idle mode. The value X is slightly larger than the back-off timer value so the mobile reachable timer will be expired after the expiry of the MM back-off timer. Preferably, the value X is four minutes longer than the back-off timer value. The UE receives the TAU/RAU reject message from the core network. Since the TAU/RAU reject message includes the back-off timer value the UE applies the back-off timer value to the periodic TAU/RAU timer (e.g. T3412, T3412ext, T3312, T3312ext) and starts/restarts the periodic TAU/RAU timer. Namely, the periodic TAU/RAU timer expires at the same time as the MM back-off timer. Hence the UE will send periodic TAU/RAU request to the MME/SGSN immediately when the MM back-off timer is expired. Consequently, the longer values of the periodic TAU/RAU timer and Mobile Reachable timer are supported and the periodic TAU/RAU timer is updated by the TAU/RAU update reject message.

Please note that the processes 30A and 30B can be applied to the UE and the core network when the UE is rejected by not only the TAU/RAU request but also a service request and a location area update request, such variation are also included in the scope of the present invention. The TAU request corresponds to a LTE system; the RAU request corresponds to a GPRS system; the location area update corresponds to a GSM system.

Figure 4:
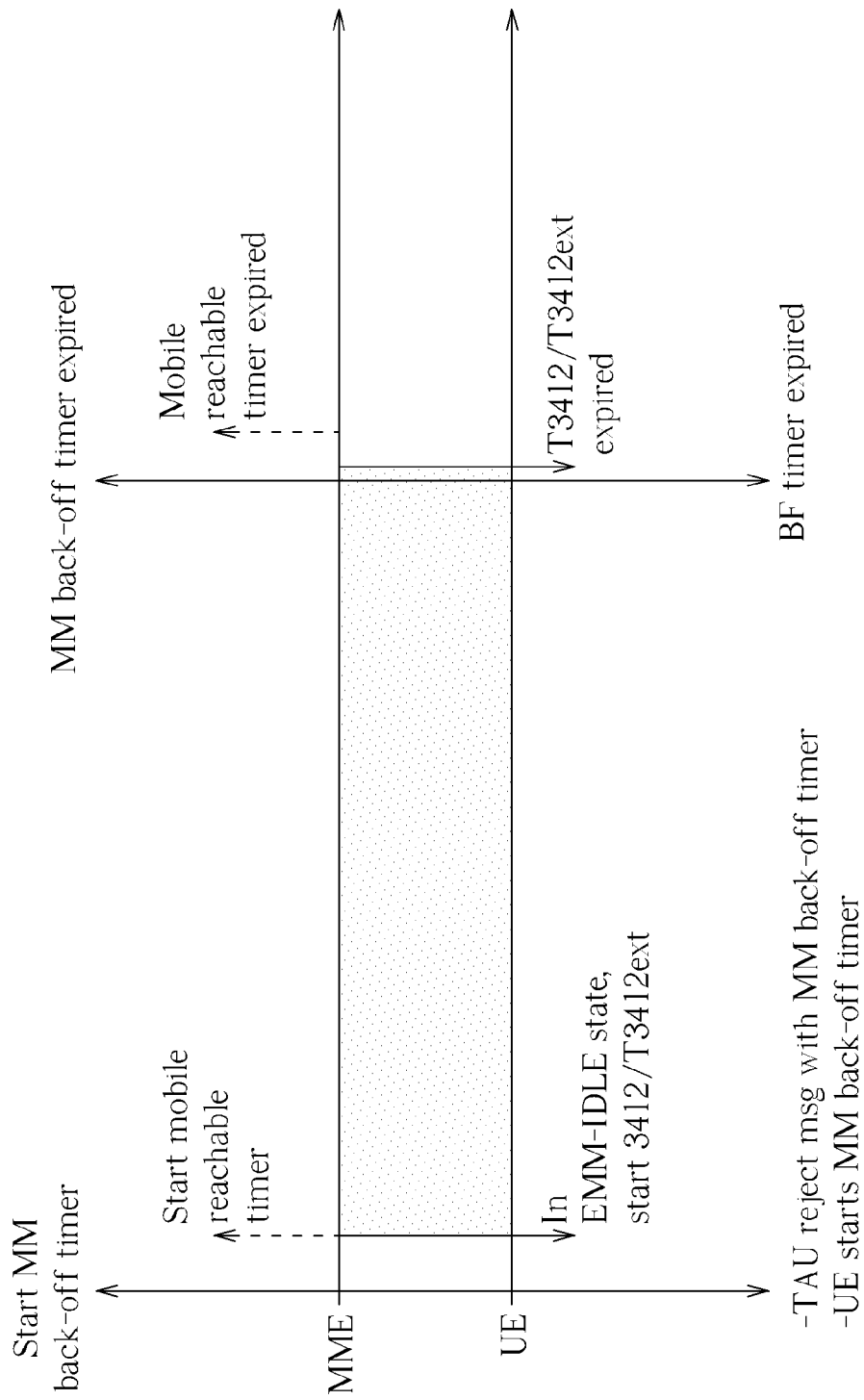
FIG. 4 is an exemplary signal sequence according to the process in FIGS. 3A and 3B.

Please refer to FIG. 4, which is an exemplary signal sequence according to the process 30. The MME sends a TAU reject message with the MM back-off timer. The UE starts the MM back-off timer. The MME sets mobile reachable timer to the value X larger than the back-off timer value. The UE applies the back-off timer value to the timer T3412/T3412 ext. The UE sends TAU request when T3412/T3412 timer and the MM back-off timer expire. The mobile reachable timer expires slightly after the MM back-off timer expires.

Figure 5A:
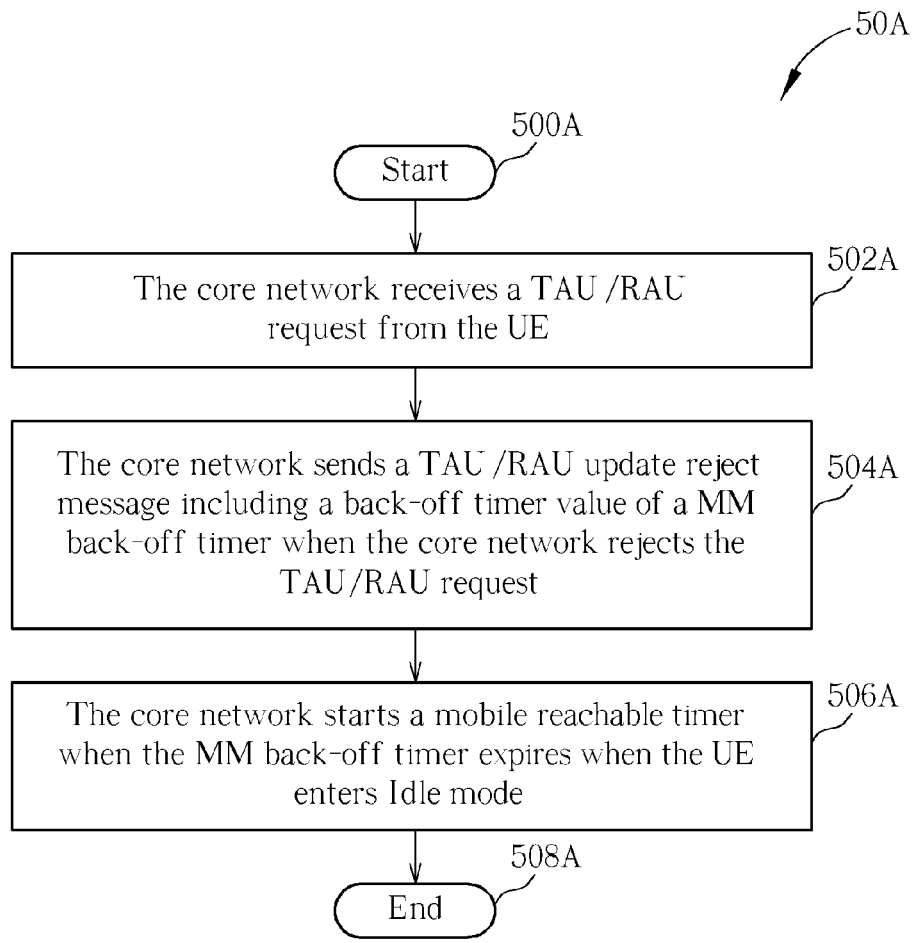
FIGS. 5A and 5B are flowcharts of exemplary processes.
Figure 5B:
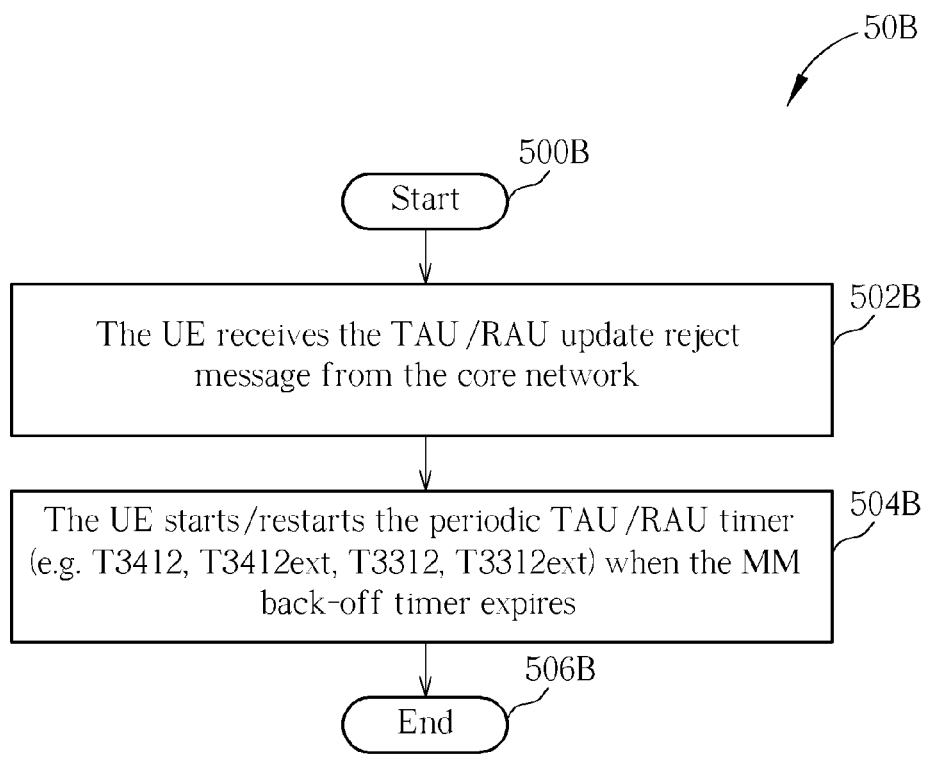

Please refer to FIG. 5A and FIG. 5B, which are flowcharts of exemplary processes 50A and 50B. The process 50A is used for handling timer configuration in the core network (e.g. MME/SGSN) in the wireless communication system 10 and the process 50B is used for handling timer configuration in the UE in the wireless communication system 10. The processes 50A and 50B may be compiled into the program code 214 and includes the following steps:

Step 500A: Start.

Step 502A: The core network receives a TAU/RAU request from the UE.

Step 504A: The core network sends a TAU/RAU reject message including a back-off timer value of a MM back-off timer when the core network rejects the TAU/RAU request.

Step 506A: The core network starts a mobile reachable timer when the MM back-off timer expires when the UE enters Idle mode.

Step 508A: End.

Step 500B: Start.

Step 502B: The UE receives the TAU/RAU reject message from the core network.

Step 504B: The UE starts/restarts the periodic TAU/RAU timer (e.g. T3412, T3412ext, T3312, T3312ext) when the MM back-off timer expires.

Step 506B: End.

According to the processes 50A and 50B, the core network (e.g. MME/SGSN) receives the TAU/RAU request from the UE. The core network sends a TAU/RAU reject message including the back-off timer value of the MM back-off timer to the UE. The rejection of the TAU/RAU could be caused by the NAS level Mobility Management Congestion Control. Then the core network starts the mobile reachable timer when the MM back-off timer expires. The UE receives the TAU/RAU reject message from the core network. During the MM back-off timer running, the UE does not start TAU/RAU timer. The UE starts/restarts the periodic TAU/RAU timer (e.g. T3412, T3412ext, T3312, T3312ext) when the MM back-off timer expires. The UE applies a stored periodic TAU/RAU timer value. Consequently, the periodic TAU/RAU timer and Mobile Reachable timer start or restart when the MM back-off timer expires.

Please note that the processes 50A and 50B can be applied to the UE and the core network when the UE is rejected by not only the TAU/RAU request but also a service request and a location area update request, such variation are also included in the scope of the present invention. The TAU request corresponds to a LTE system; the RAU request corresponds to a GPRS system; the location area update corresponds to a GSM system.

Figure 6:
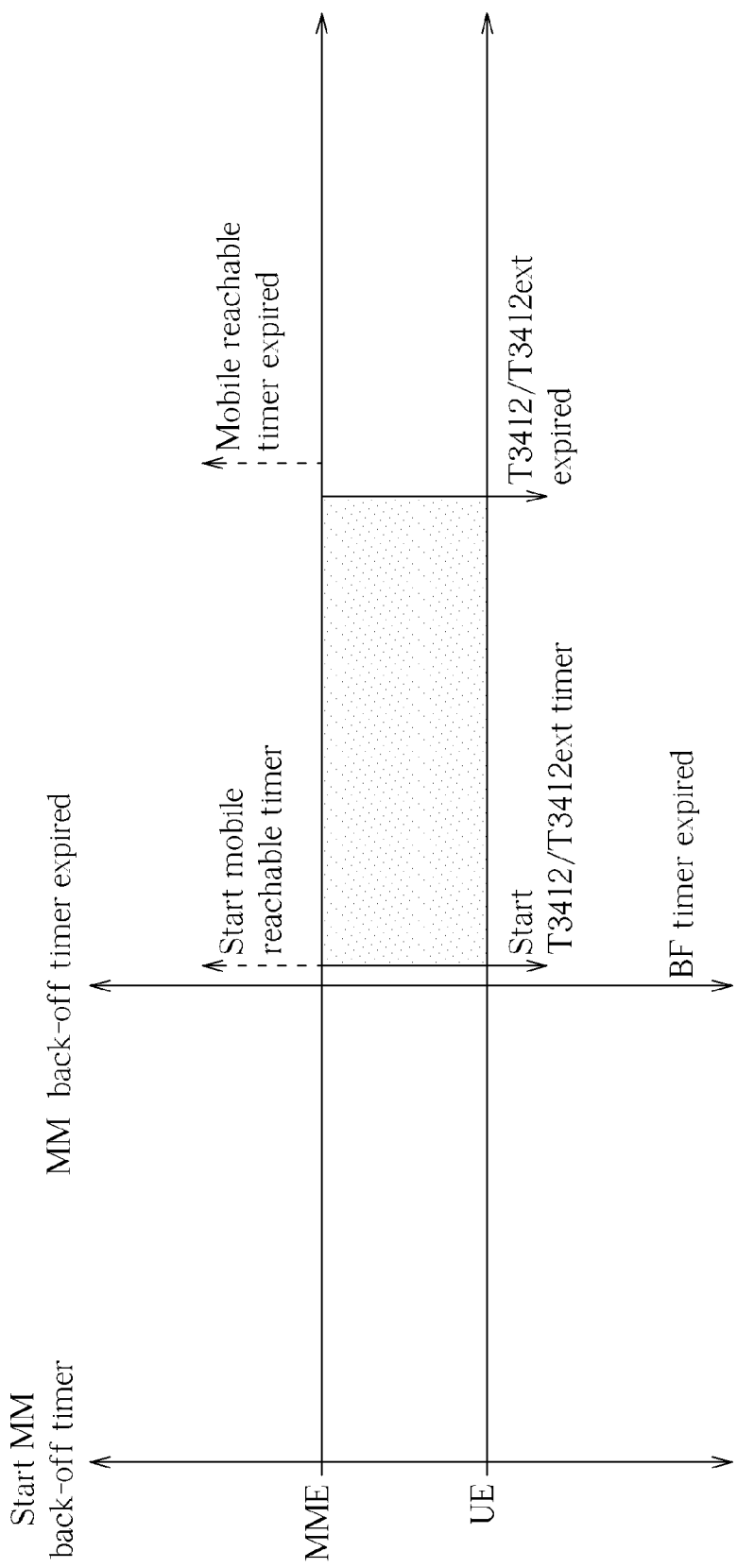
FIG. 6 is an exemplary signal sequence according to the process in FIGS. 5A and 5B.

Please refer to FIG. 6, which is an exemplary signal sequence according to the process 50. The MME sends a TAU reject message with the MM back-off timer. The UE and MME start the MM back-off timer. When the MM back-off timer expires, the MME and the UE starts the mobile reachable timer and the timer T3412/T3412 ext, respectively.

Figure 7A:
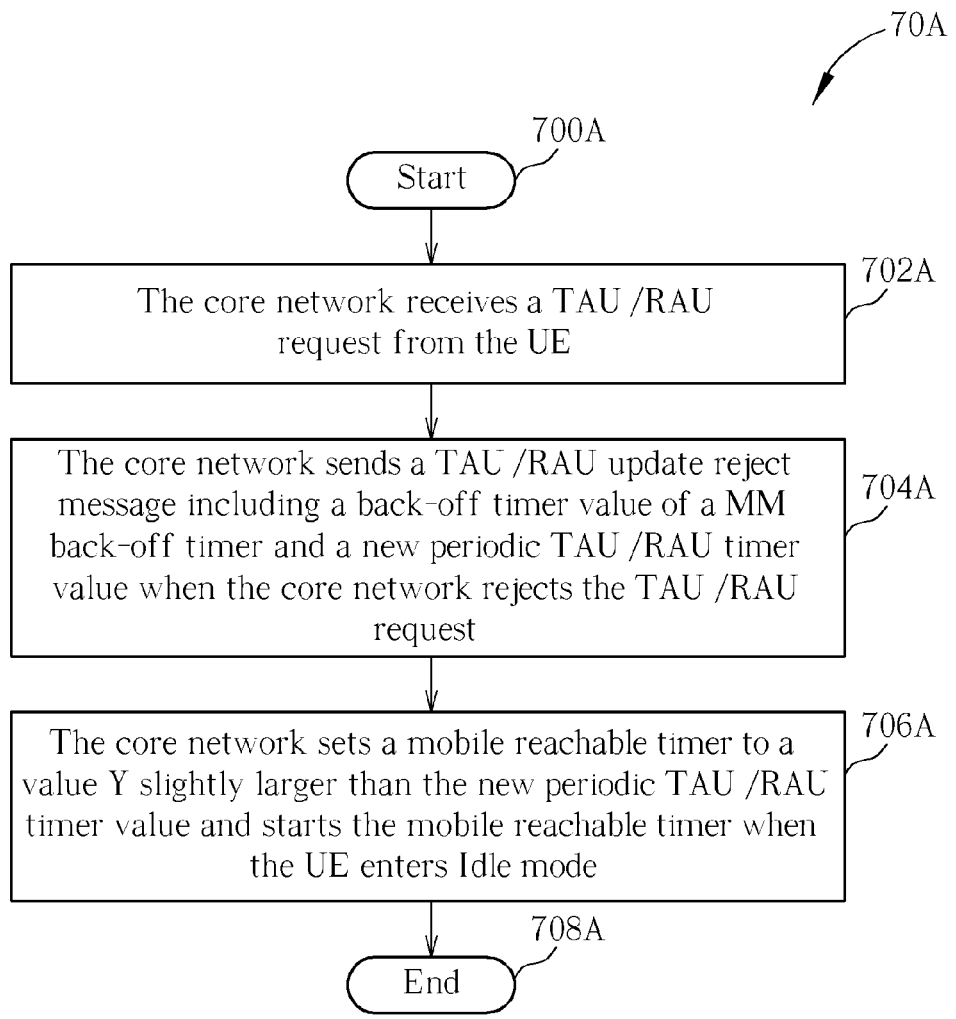
FIGS. 7A and 7B are flowcharts of exemplary processes.
Figure 7B:
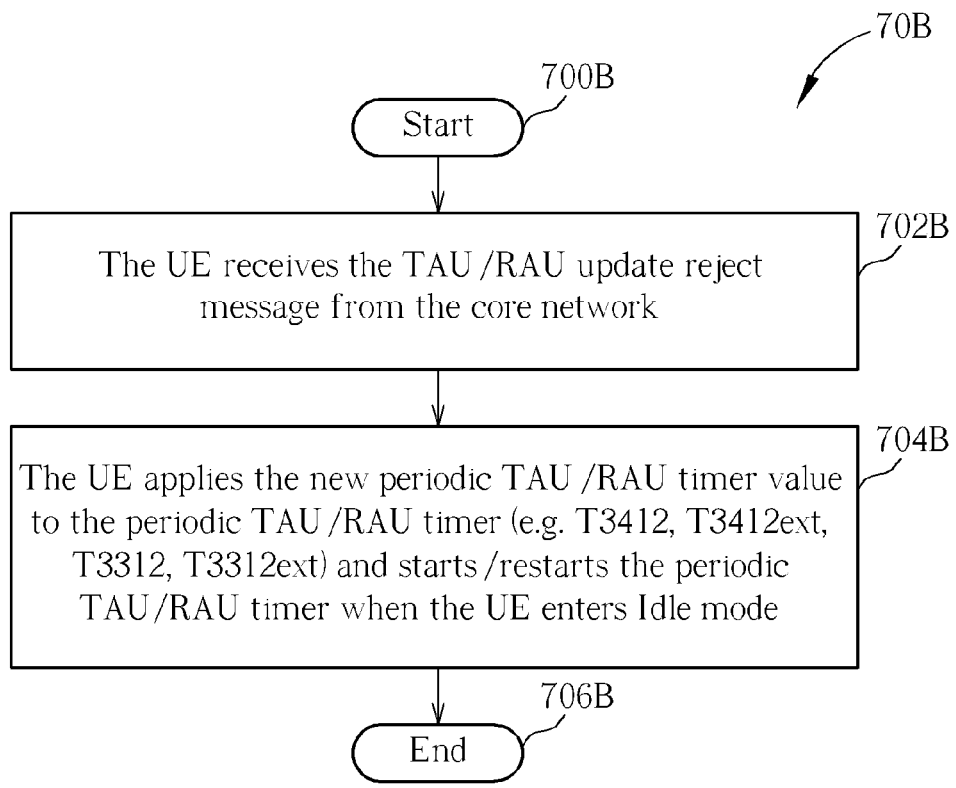

Please refer to FIG. 7A and FIG. 7B, which are flowcharts of exemplary process 70A and 70B. The process 70A is used for handling timer configuration in the core network (e.g. MME/SGSN) the wireless communication system 10 and the process 70B is used for handling timer configuration in the UE in the wireless communication system 10. The processes 70A and 70B may be compiled into the program code 214 and includes the following steps:

Step 700A: Start.

Step 702A: The core network receives a TAU/RAU request from the UE.

Step 704A: The core network sends a TAU/RAU reject message including a back-off timer value of a MM back-off timer and a new periodic TAU/RAU timer value when the core network rejects the TAU/RAU request.

Step 706A: The core network sets a mobile reachable timer to a value Y slightly larger than the new periodic TAU/RAU timer value and starts the mobile reachable timer when the UE enters idle mode.

Step 708A: End.

Step 700B: Start.

Step 702B: The UE receives the TAU/RAU update reject message from the core network.

Step 704B: The UE applies the new periodic TAU/RAU timer value to the periodic TAU/RAU timer (e.g. T3412, T3412ext, T3312, T3312 ext) and starts/restarts the periodic TAU/RAU timer when the UE enters idle mode.

Step 706B: End.

According to the processes 70A and 70B, the core network (e.g. MME/SGSN) receives the TAU/RAU request from the UE. The core network sends a TAU/RAU update reject message including the back-off timer value of the MM back-off timer and the new periodic TAU/RAU timer value to the UE. The rejection of the TAU/RAU could be caused by the NAS level Mobility Management Congestion Control. The new periodic TAU/RAU timer value is larger than the back-off timer value. Then the core network sets the mobile reachable timer to the value Y and starts the mobile reachable timer when the UE enters Idle mode. The value Y is slightly larger than the value of the new periodic TAU/RAU timer so the mobile reachable timer will expire after the periodic TAU/RAU timer. Preferably, the value Y is four minutes longer than the new periodic TAU/RAU timer value. The UE receives the TAU/RAU reject message from the core network. The UE applies the new periodic TAU/RAU timer value (e.g. T3412, T3412ext, T3312, T3312 ext) and starts/restarts the periodic TAU/RAU timer when it enters IDLE mode. Consequently, the longer values of the periodic TAU/RAU timer and Mobile Reachable timer are supported and the periodic TAU/RAU timer is updated by the TAU/RAU update reject message.

Please note that the processes 70A and 70B can be applied to the UE and the core network when the UE is rejected by not only the TAU/RAU request but also a service request and a location area update request, such variation are also included in the scope of the present invention. The TAU request corresponds to a LTE system; the RAU request corresponds to a GPRS system; the location area update corresponds to a GSM system.

Figure 8:
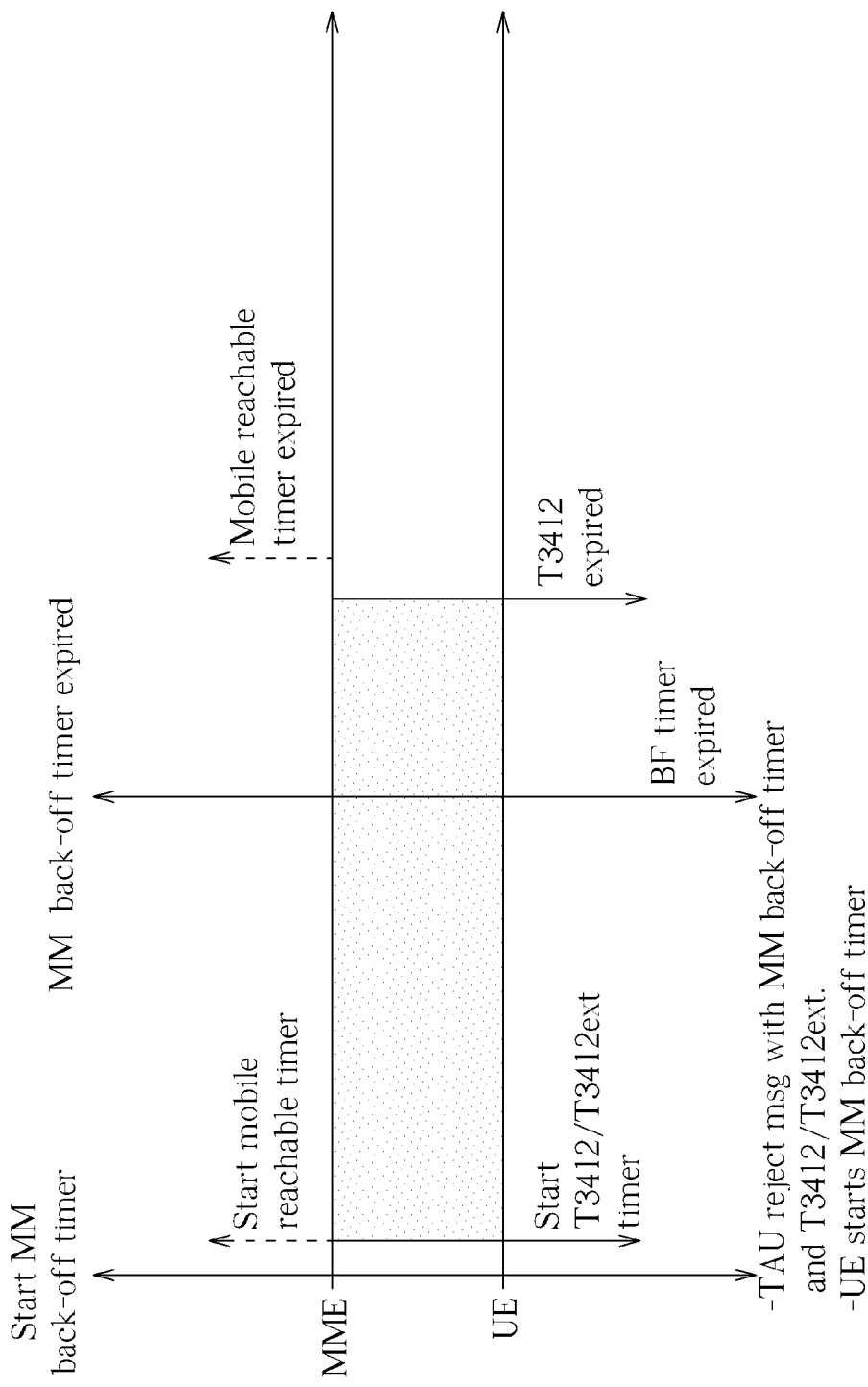
FIG. 8 is an exemplary signal sequence according to the process in FIGS. 7A and 7B.

Please refer to FIG. 8, which is an exemplary message sequence according to the processes 70A and 70B. The MME sends a back-off timer value and a new periodic TAU/RAU timer value in the TAU/RAU update reject message. Afterwards, the MME sets mobile reachable timer to a value Y larger than the new periodic TAU/RAU timer value. The UE applies the new periodic TAU/RAU timer value to the timer T3412/T3412 ext.

Figure 9:
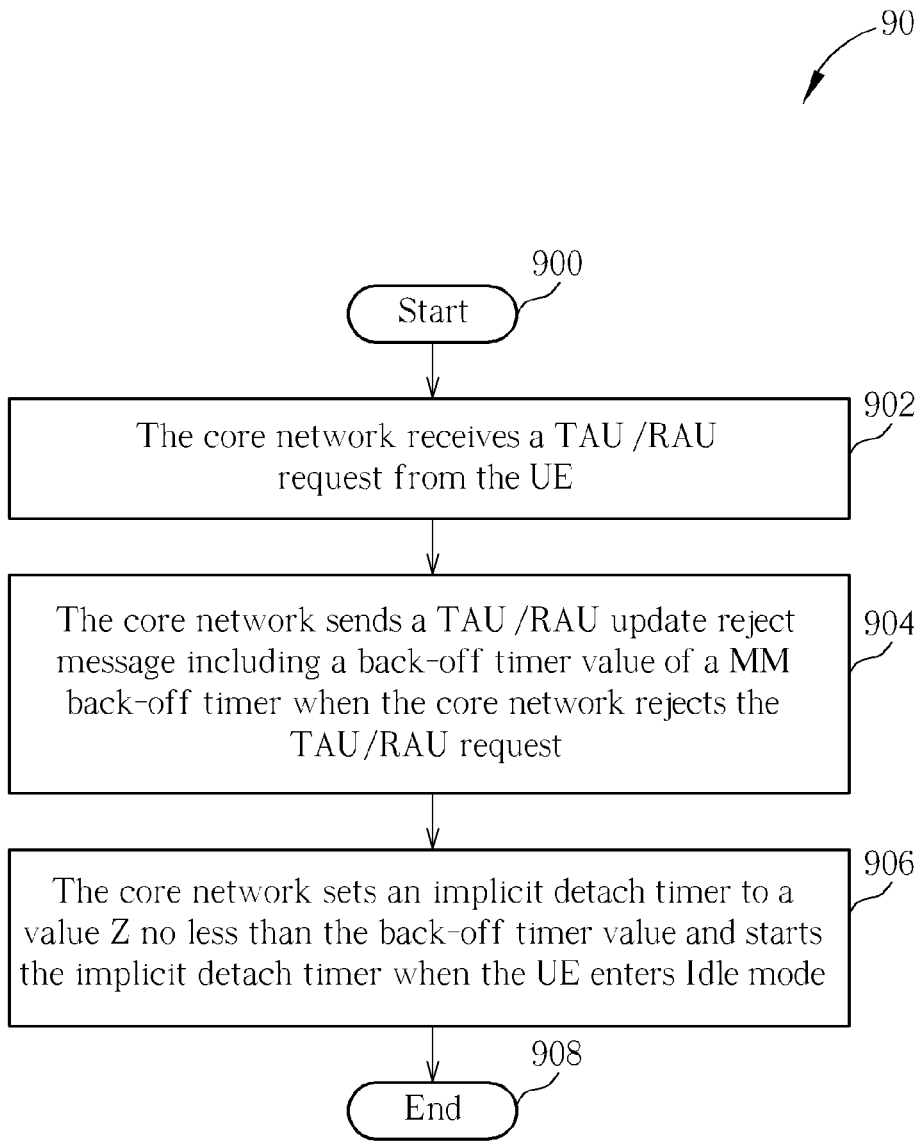
FIG. 9 is a flowchart of an exemplary process.

Please refer to FIG. 9, which is a flowchart of an exemplary process 90. The process 90 is used for handling timer configuration in the core network (e.g. MME/SGSN) and the UE in the wireless communication system 10. The process 90 may be compiled into the program code 214 and includes the following steps:

Step 900: Start.

Step 902: The core network receives a TAU/RAU request from the UE.

Step 904: The core network sends a TAU/RAU update reject message including a back-off timer value of a MM back-off timer when the core network rejects the TAU/RAU request.

Step 906: The core network sets an implicit detach timer to a value Z no less than the back-off timer value and starts the implicit detach timer when the UE enters IDLE mode.

Step 908: End.

According to the process 90, the core network (e.g. MME/SGSN) receives the TAU/RAU request from the UE. The core network sends a TAU/RAU update reject message including the back-off timer value of the MM back-off timer to the UE. The rejection of the TAU/RAU could be caused by the NAS level Mobility Management Congestion Control. Then the core network sets the implicit detach timer to the value Z. The value Z is slightly larger than the MM back-off timer value. In other words, the core network does not change the value of a mobile reachable timer. In addition, to allow the core network for paging the UE when the network clears network congestion situation and there is a mobile terminated call for the UE, the network may not clear a paging proceed factor (PPF) when the mobile reachable timer is expired and there is the MM back-off timer running.

The core network may not start the mobile reachable timer but only starts the implicit detach timer. That is, PPF is not clear. By this way, the network is still allowed to page the UE when the network congestion is clear and there is Mobile terminated call for the UE.

Please note that the processes 90 can be applied to the core network when the UE is rejected by not only the TAU/RAU request but also a service request and a location area update request, such variation are also included in the scope of the present invention. The TAU request corresponds to a LTE system; the RAU request corresponds to a GPRS system; the location area update corresponds to a GSM system.

Figure 10:
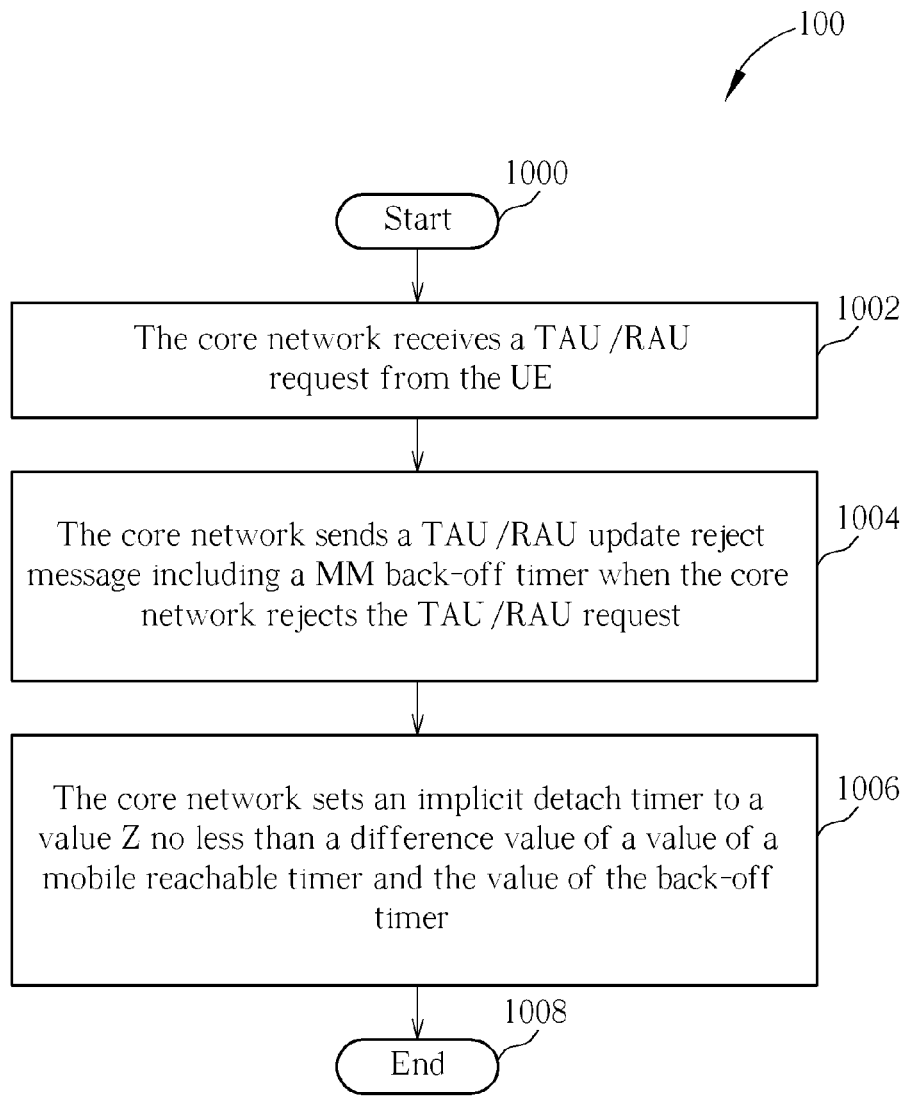
FIG. 10 is a flowchart of an exemplary process.

Please refer to FIG. 10, which is a flowchart of an exemplary process 100. The process 100 is used for handling timer configuration in the core network (e.g. MME/SGSN) in the wireless communication system 10. The process 100 may be compiled into the program code 214 and includes the following steps:

Step 1000: Start.

Step 1002: The core network receives a TAU/RAU request from the UE.

Step 1004: The core network sends a TAU/RAU reject message including a back-off timer value of a MM back-off timer when the core network rejects the TAU/RAU request.

Step 1006: The core network sets an implicit detach timer to a value Z no less than a difference value of a value of a mobile reachable timer and a value of the back-off timer.

Step 1008: End.

According to the process 100, the core network (e.g. MME/SGSN) receives the TAU/RAU request from the UE. The core network sends a TAU/RAU reject message including the back-off timer value of a MM back-off timer to the UE. The rejection of the TAU/RAU could be caused by the NAS level Mobility Management Congestion Control. Then the core network sets the implicit detach timer to the value Z. The value Z is slightly larger than the difference value of a value of a mobile reachable timer and the value of the back-off timer. In other words, the core network does not change the value of a mobile reachable timer. In addition, to allow the network to page the UE when the network clears network congestion situation and there is a mobile terminated call for the UE, the network may not clear a paging proceed factor (PPF) when the mobile reachable timer is expired and there is the MM back-off timer running.

Please note that the processes 100 can be applied to the core network when the UE is rejected by not only the TAU/RAU request but also a service request and a location area update request, such variation are also included in the scope of the present invention. The TAU request corresponds to a LTE system; the RAU request corresponds to a GPRS system; the location area update corresponds to a GSM system.

Figure 11:
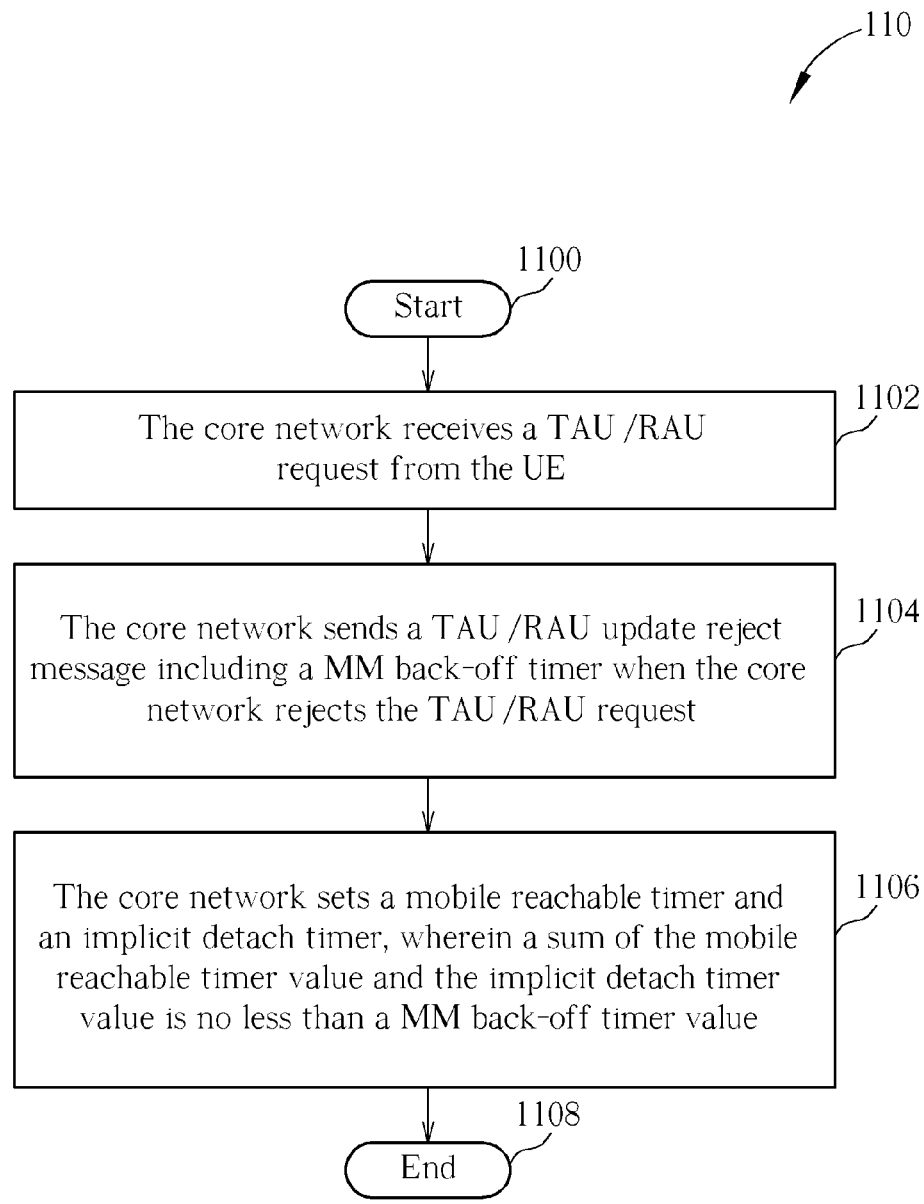
FIG. 11 is a flowchart of an exemplary process.

Please refer to FIG. 11, which is a flowchart of an exemplary process 110. The process 110 is used for handling timer configuration in the core network (e.g. MME/SGSN) and the UE in the wireless communication system 10. The process 1100 may be compiled into the program code 214 and includes the following steps:

Step 1100: Start.

Step 1102: The core network receives a TAU/RAU request from the UE.

Step 1104: The core network sends a TAU/RAU update reject message including a back-off timer value of a MM back-off timer when the core network rejects the TAU/RAU request.

Step 1106: The core network sets a mobile reachable timer and an implicit detach timer, wherein a sum of the mobile reachable timer value and the implicit detach timer value is no less than a back-off timer value.

Step 1108: End.

According to the process 110, the core network (e.g. MME/SGSN) receives the TAU/RAU request from the UE. The core network sends a TAU/RAU update reject message including the back-off timer value of the MM back-off timer to the UE. The rejection of the TAU/RAU could be caused by the NAS level Mobility Management Congestion Control. Then the core network sets the mobile reachable timer and the implicit detach timer based on operator policies such that the sum of the mobile reachable timer value and the implicit detach timer value is no less than the back-off timer value.

Please note that the processes 110 can be applied to the core network when the UE is rejected by not only the TAU/RAU request but also a service request and a location area update request, such variation are also included in the scope of the present invention. The TAU request corresponds to a LTE system; the RAU request corresponds to a GPRS system; the location area update corresponds to a GSM system.

A PPF flag may or may not be clear when the mobile reachable timer is expired. If the PPF flag is not clear when the mobile reachable timer is expired so the network can still page the back-off UE. When there is a mobile terminated call for the back-off UE, the network can page the UE to stop the MM back-off timer if the network congestion is clear and the PPF flag is not clear.

The abovementioned steps of the processes may be executed when the MME/SGSN includes a back-off timer value of the MM back-off timer in the TAU/RAU REJECT message or the SERVICE REJECT message and the back-off timer value is greater than the periodic TAU/RAU timer value.

The abovementioned steps of the processes about mobile reachability management can be adapted to apply to the UE and MSC in the GSM network. Those skilled in the art can readily make necessary modifications and alterations to the circuit switch system to achieve this adaptation while retaining the teachings of this invention.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the longer values of the periodic TAU/RAU timer and mobile reachable timer are supported to reduce network load from periodic TAU/RAU signaling and to increase the time until the UE detects a potential need for changing the RAT or PLMN (e.g. due to network problems). The MME/SGSN can allocate long periodic RAU/TAU timer value to the UE. The value of periodic timer (e.g. T3412, T3412ext, T3312, T3312 ext) is sent by the network to the UE via the ATTACH ACCEPT message and the TRACKING/ROUTING AREA UPDATE ACCEPT message. Since the mobile reachable timer with the longer value expires after the back-off timer, this avoids misjudging the out-of-coverage of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A timer configuration method for a core network in a wireless communication system, the timer configuration method comprising:
   receiving a mobility management request from a mobile device; and
   setting a mobile reachable timer to a mobile reachable timer value and setting an implicit detach timer to an implicit detach timer value when the core network rejects the mobility management request with a back-off timer value of a back-off timer,
   wherein the mobile reachable timer is started when the mobile device enters an idle mode;
   wherein the implicit detach timer is started upon expiry of the mobile reachable timer; the mobile device is implicitly detached by the core network when the implicit detach timer expires before the mobile device contacts the core network;
   wherein a sum of the mobile reachable timer value and the implicit detach timer value is no less than the back-off timer value, so that the mobile device still remains attached to the core network when the back-off timer expires.

2. The timer configuration method of claim 1 further comprising not clearing a paging proceed factor (PFF) when the mobile reachable timer expires.

3. The timer configuration method of claim 1, wherein the mobility management request is a service request, a tracking area update request, a routing area update request or a location update request.

* * * * *